(12) United States Patent
Uhlig

(10) Patent No.: US 6,257,063 B1
(45) Date of Patent: Jul. 10, 2001

(54) METHOD FOR MEASURING VIBRATION DAMPING

(75) Inventor: Robert P Uhlig, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/578,341

(22) Filed: May 24, 2000

(51) Int. Cl.⁷ .................................................... G01H 1/00
(52) U.S. Cl. ............................... 73/579; 73/664; 73/662; 73/11.05
(58) Field of Search .......................... 73/570, 579, 662, 73/664, 11.05, 660, 671, 657, 866.5, 573, 574, 584

(56) References Cited

U.S. PATENT DOCUMENTS

| | | | |
|---|---|---|---|
| Re. 23,090 | 3/1949 | Firestone | 73/67 |
| 2,618,968 | 11/1952 | McConnell | 73/67 |
| 2,758,706 | 5/1956 | Quinlan | 203/75 |
| 3,228,233 | 1/1966 | Keldenich | 73/67 |
| 3,417,610 | 12/1968 | Nance et al. | 73/67 |
| 4,211,105 | 7/1980 | Szabo et al. | 73/11 |
| 4,315,215 | * 2/1982 | Onodera et al. | 324/248 |
| 4,502,329 | 3/1985 | Fukunaga et al. | 73/573 |
| 4,513,622 | 4/1985 | Uretsky | 73/664 |
| 4,543,827 | 10/1985 | Tominaga et al. | 73/602 |
| 4,545,249 | 10/1985 | Matay | 73/597 |
| 4,817,431 | 4/1989 | Schlawne | 73/600 |
| 4,979,952 | 12/1990 | Kubota et al. | 318/169 |
| 5,086,564 | 2/1992 | Schalz | 248/638 |
| 5,113,697 | 5/1992 | Schlawne | 73/602 |
| 5,275,052 | 1/1994 | Luttrell | 73/619 |
| 5,734,712 | * 3/1998 | Randahl | 379/382 |
| 6,014,899 | * 1/2000 | Uhlig et al. | 73/664 |

* cited by examiner

Primary Examiner—Hezron Williams
Assistant Examiner—Jacques Saint-Surin
(74) Attorney, Agent, or Firm—Mark P. Calcaterra

(57) ABSTRACT

The vibration damping properties of a brake rotor (or other vibration-prone component) can be measured by vibrating the component part at its resonant frequency, using a magnetic coil that is excited by an A.C. signal having a frequency that is one half the frequency of the vibrating wave generated in the component. The A.C. signal crosses the zero current axis twice per current cycle, so that the magnetic flux in the coil core reverses polarity at the frequency selected for vibrating the part.

1 Claim, 3 Drawing Sheets

FIG 6
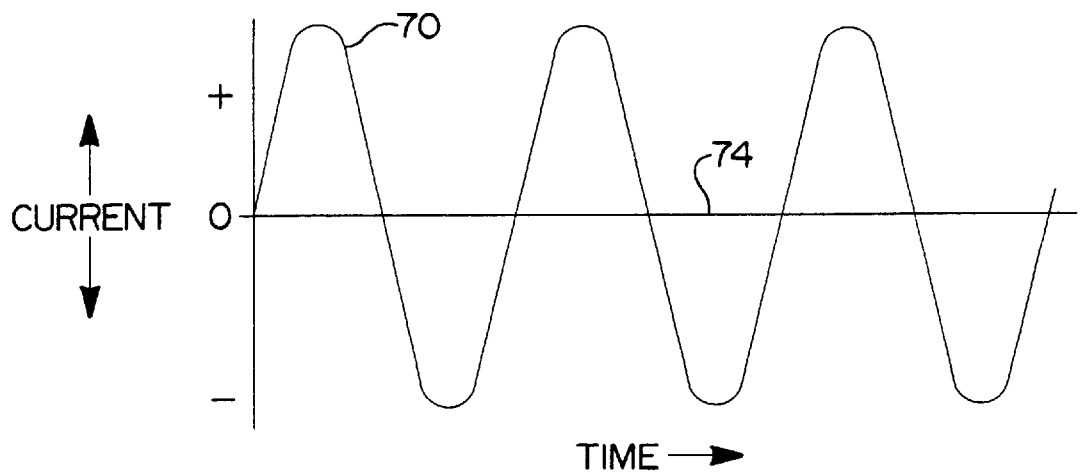
FIG 7
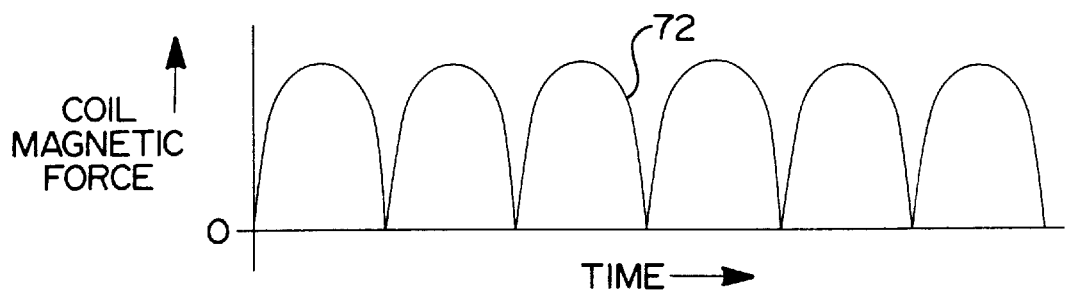
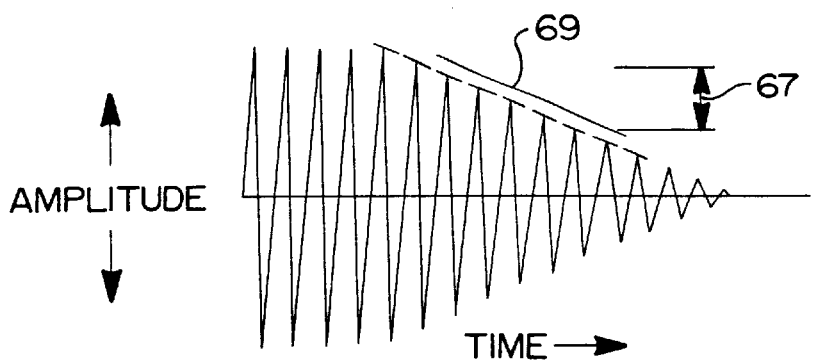
FIG 8

METHOD FOR MEASURING VIBRATION DAMPING

REFERENCE TO A RELATED PATENT AND PATENT APPLICATION

This patent application is related to U.S. Pat. No. 6,014,899 and to pending U.S. patent application Ser. No. 09/519,485, filed on Mar. 6, 2000. In each case the respective invention concerns a method of measuring the damping capability of a part, wherein the part is vibrated to place the part in a steady state vibrating condition at a known frequency. The vibration source is then deactivated so that the part experiences a decay in vibration amplitude. By measuring the time required to produce a known decrease in vibration amplitude, it is possible to compute a Q-factor representative of the damping capability of the part.

BACKGROUND OF THE INVENTION

1. Field of the Invention

The present invention relates in general to predicting the level of noise or brake squeal produced by a brake part during braking, and relates in particular to a method and apparatus for defining and quantifying vibration and noise suppression of a brake part as a single number known as the quality factor or Q-factor.

2. Description of Prior Development

A longstanding problem associated with the use of vehicle brakes is the generation of annoying noise often referred to as brake squeal. Brake rotors and drums, such as used in virtually all transportation vehicles, are generally considered to be the source of a variety of such noises and associated vibrations.

In order to reduce brake noise, brake rotors and drums have been manufactured using materials and processes which tend to reduce the vibrations produced during braking. Typically, the greater the ability of a brake part to damp vibrations, the less apt the part is to make undesirable braking noise.

Brake component manufacturers, as well as brake system designers, manufacturers and assemblers have attempted to control brake system noise by specifying a minimum amount or minimum level of vibration damping inherent in brake components such as brake rotors and brake drums. Unfortunately, conventional vibration damping measuring techniques used to establish and verify vibration damping properties of brake components have not always provided consistent measurements.

That is, prior vibration measuring techniques attempted to qualify vibration damping performance in terms of a quality factor commonly expressed as a dimensionless number referred to as the Q-factor. The lower the Q-factor, the higher the damping performance of the part and the less likely the part is to squeal during use. In order to quantify the amount of vibration damping in a part, the Q-factor is calculated from the product of a constant term of 27.3 multiplied by the resonant frequency of the part in Hertz and divided by the slope of the vibration decay curve of the part.

Although Q-factors have been specified by original equipment manufacturers (OEMs) such as car and truck manufacturers, significant differences in Q-factors have been measured by suppliers and OEMs when measuring the same components. Variations in Q-factor measurement of up to 25 percent have been experienced, even when measuring the same part several times in the same test fixture.

This lack of repeatability in Q-factor measurement can lead to acceptance issues between manufacturers and suppliers regarding the acceptability of brake components.

U.S. Pat. No. 6,014,899 discloses a method of determining the Q-factor, wherein vibration decay rate measurements are taken at a plurality of spaced locations along the tested part. The Q-factors obtained at the various test locations can be averaged to obtain a representative Q-factor for the test part. One difficulty with the method described in U.S. Pat. No. 6,014,899 is that considerable time is required to carry out the measurements at all of the test locations. Typically, decay rate measurements are required at twenty or more locations on the tested part. For optimum results, plural measurements are taken at each test location.

Copending patent application Ser. No. 09/519,485 discloses a method for determining optimum locations on the part for performing the decay rate measurements. Use of this method can reduce the number of decay rate measurements required to determine a representative Q-factor.

In the methods described in U.S. Pat. No. 6,014,899 and U.S. patent application Ser. No. 09/519,485 the tested part is put into the vibrational mode by means of an exciter coil that is supplied with a sinusoidal alternating current having a D.C. offset. The tested part vibrates at the same frequency as the A.C. current supplied to the exciter coil.

The described method of coil excitation has some disadvantages. The output of the sine wave generator must be amplified accurately in order to produce a strong enough force to move a part at the desired frequency and amplitude; typically the tested part weights on the order of ten pounds. The amplifier needs to be able to amplify both the sine wave and the D.C. Voltage level linearly, with an equal gain for both the A.C. and D.C. portions over the frequency range of interest. Ripples or variations in the D.C. current can have an adverse effect on the repeatability (or accuracy) of the amplitude in the A.C. current waveform supplied to the exciter coil. The trough of the amplified sine wave must have a repeatable non-symmetrical relationship to the zero current axis in order to achieve a satisfactory vibrational amplitude in the test part.

The described arrangement requires a relatively expensive amplifier capable of accurately amplifying the D.C. and A.C. portions of the signal. Heat dissipation and non-linearity problems associated with creating the D.C. input signal have to be considered.

The present invention relates to a method of coil excitation wherein an A.C. waveform is employed at one half the frequency of the vibration frequency imparted to the tested part. The A.C. waveform is symmetrical around the zero current axis, so that the A.C. current crosses the zero current axis at twice the A.C. current frequency. The magnetic flux in the coil reverses polarity in synchronism with the A.C. current zero-crossover occurrences, such that the part vibrates at twice the frequency of the A.C. waveform supplied to the exciter coil.

A principal advantage of the invention is that the coil excitation current requires no D.C. offset current. A relatively low cost amplifier can be used to supply the coil with an A.C. waveform that is repeatable, without uncertainties as to amplifier performance. The amplifier is required only to amplify a pure A.C. sine wave; no D.C. offset current is used.

Further features of the invention will be apparent from the attached drawings and description of an apparatus used in practicing the method of the present invention.

Associated electrical apparatus used with the vibrator is shown schematically.

Figure 2:
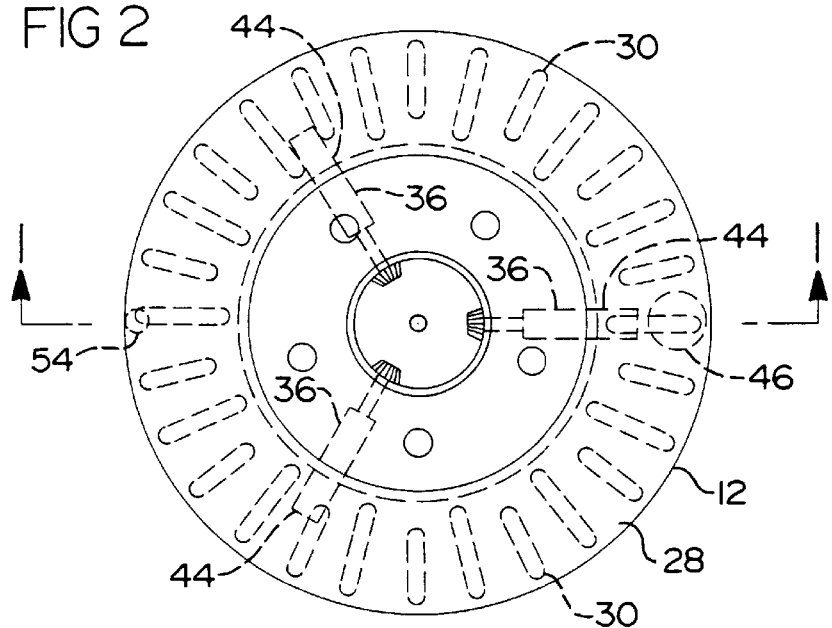
Figure 1:
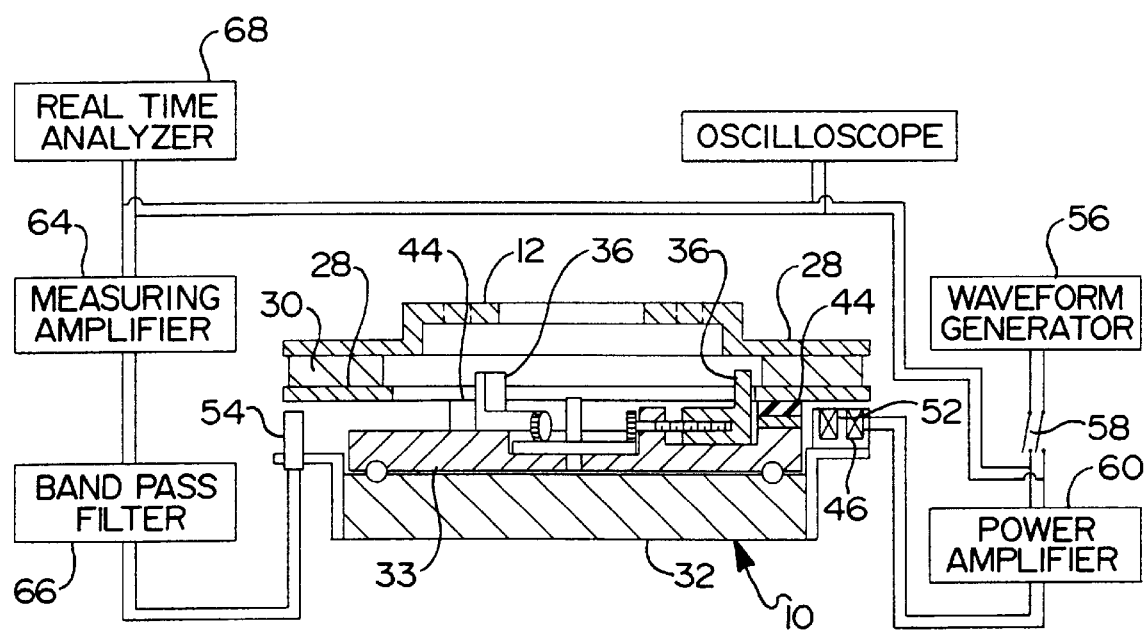
FIG. 1 is a sectional view taken through a brake rotor arranged on vibrator useful in practice of the invention.

FIG. 2 is a plan view of the FIG. 1 vibrator.

Figure 3:
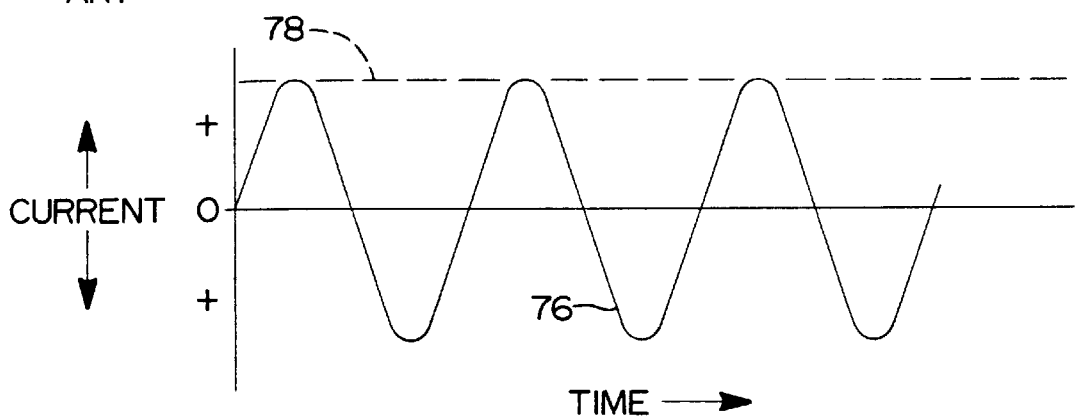
Figure 4:
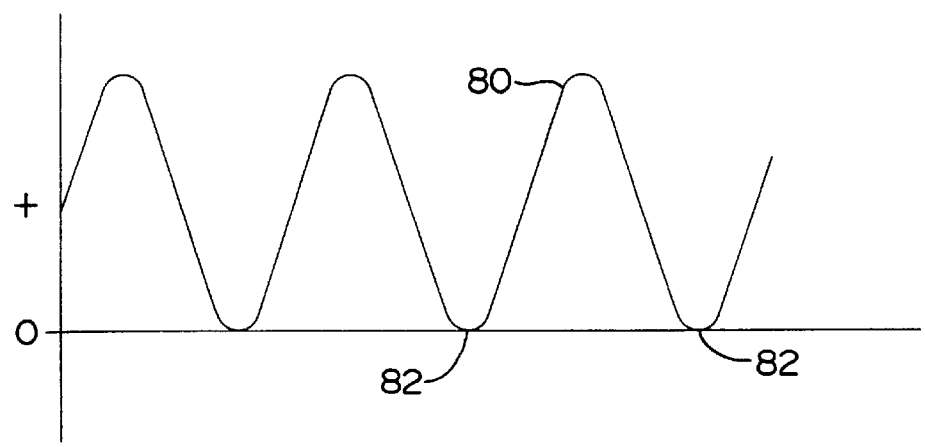
Figure 5:
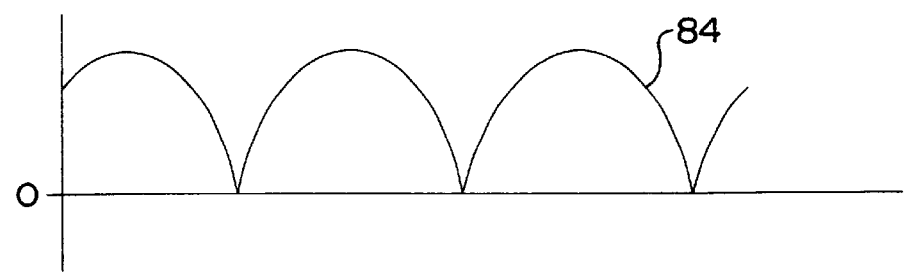

FIGS. 3, 4 and 5 are graphs for describing the performance of the prior art apparatus disclosed in U.S. Pat. No. 6,014,899.

FIGS. 6 through 8 are graphs describing the performance of the apparatus used in the present invention.

DESCRIPTION OF A PREFERRED APPARATUS USED IN PRACTICE OF THE INVENTION

Referring to FIGS. 1 and 2, there is shown a vibrator 10 for vibrating a part whose damping capability is to be measured. In this case the part to be tested (vibrated) is a brake rotor 12 having two side plates 28 connected by a series of radial vanes 30.

Vibrator 10 has the same construction as the vibrator shown in U.S. Pat. No. 6,014,899. As herein shown, the vibrator includes a fixed base 32 that supports a rotary turntable 33; lock mechanisms (not shown) are used to set the turntable in selected positions of rotary adjustment.

A centering mechanism is provided on the turntable for aligning rotor 12 with the turntable axis. As shown, the centering mechanism includes three evenly spaced jaws 36 that can be simultaneous adjusted along radial lines, whereby the jaws can engage the inner edge of a rotor side plate 28 to center the rotor. A vibration isolating pad 44 is associated with each jaw 36 for isolating vibration and energy transmission between the turntable and rotor 12. The vibration isolating improves the accuracy of the test data by minimizing the influence of external factors, i.e., boundary conditions.

The sample rotor 12 is placed on the elastomeric isolating pads 44, and the chuck jaws 36 are opened to simultaneous contact the edge of rotor plate 28, thereby centering the rotor. Jaws 36 are then retracted, leaving the brake rotor supported only by contact with the isolating pads 44. Alternatively, the apparatus disclosed in U.S. Pat. No. 6,014,899 can be used in the practice of the present invention.

An exciter coil 46 is vertically positioned at a predetermined vertical spacing from the lower side plate 28. Coil 46 is located proximate to the outer edge of plate 28, so that plate 28 can be in the magnetic flux path generated by magnetic core 52 of the exciter coil. The exciter coil 46 electromagnetically induces vibrations in rotor 12 without direct physical contact between the core and rotor. An A.C. current waveform supplied to the exciter coil produces a pulsing magnetic field in core 52. Preferably the excitation current frequency is one half the resonant frequency of the part being tested. Each cycle in the A.C. current waveform produces two magnetic flux changes in core 52, such that part 12 vibrates at its resonant frequency.

The level or amplitude of vibrations induced in rotor 12 is measured with a transducer such as microphone 54 which may include a preamplifier. The microphone is also carefully positioned adjacent the rotor at a predetermined horizontal and vertical spacing from side plate 28. In the example of FIG. 1 the transducer microphone is positioned diametrically across or 180° from the exciter coil 46.

With the exciter coil and transducer aligned with the rotor such as described above, a waveform or frequency generator 56 is set to provide a sinusoidal wave output at a constant amplitude. This signal is passed through closed switch 58 to a power amplifier 60 which amplifies the output of the waveform generator and sends the amplified signal to the exciter coil 46. An oscilloscope may be connected to the output of the waveform generator to monitor the waveform frequency, as shown in U.S. Pat. No. 6,014,899.

As the exciter coil 46 magnetically induces vibrations in the rotor 12, the microphone 54 measures the sound or vibration level emitted by the rotor and provides a measure of this sound level to a measuring amplifier 64. A bandpass filter 66 may be used to eliminate frequencies outside the range of interest.

The output of the measuring amplifier is observed (via the oscilloscope) as the frequency of the waveform generator is varied. When the measuring amplifier 64 indicates that a peak or resonant frequency, fr, output signal has been received and transmitted by microphone 54, the frequency readout of the waveform generator 56 is noted. Confirmation of the resonant frequency, fr, can be obtained with the oscilloscope.

With the frequency, w, of the sine wave produced by waveform generator 56 set to produce the peak output amplitude measured by measuring amplifier 64, the gain of the audio power amplifier 60 is adjusted to produce a predetermined measured output voltage from microphone 54. More accurate data is obtained by setting the output voltage from the microphone to the same level for each test location. The real time analyzer 68 is then set to wait for triggering or opening of switch 58.

At this point, switch 58 is opened thereby interrupting the output of the waveform generator 56 and deactivating the exciter coil. This eliminates the input of vibrational energy into the rotor, causing the vibrations in the rotor to decay. This decay is recorded and graphed on a decibel versus time plot by the real time analyzer 68 which receives the decaying sound level signal from the measuring amplifier 64.

The measured values of interest obtained from this procedure are the frequency of the waveform generator at triggering and the slope of the decay curve obtained from the real time analyzer 68. In particular, at triggering of switch 58, the real time analyzer 68 plots the decay of the sound level produced by the rotor as a function of time. The resonant frequency at triggering is preferably set to an accuracy of 0.01 Hz and a predetermined portion of the decay curve is measured within an accuracy of 0.001 millisecond.

Although any portion of the decay curve may be chosen for slope measurement purposes, the time for a 25 dB decay from 90 dB to 65 dB has been found suitable for purposes of carrying out the invention. Twenty-five decibels is needed as a minimum decay span to minimize error in determining the decay rate.

FIG. 8 illustrates a typical decrease in amplitude of the decaying vibrational wave of the test part 12, triggered by opening switch 58. Measuring amplifier 65 can be set to detect the peak valves of the vibrational wave, to provide an input to analyzer 68. Slope 69 (FIG. 8) of the decay curve can be used to calculate the Q-factor at the test location of the exciter coil 46.

Preferably the measuring amplifier is set to measure the decaying vibrational motion of part 12 for only part of the decay period. In FIG. 8, the measured decay segment is denoted by arrows 67. With such an arrangement it is not necessary for the maximum amplitude of the vibrational movement to reach any specific value.

While one decay plot per test location may be adequate, it has been found advantageous to obtain two, three or more decay plots for the same test location to obtain an average. This average value is then used to compute the Q value. At this point the rotor is rotated on its support, through rotatable table 33, to a new test position, and the above procedure is repeated.

The number of test locations used is related, at least partly, to the accuracy deemed necessary by the operator.

The resonant frequency, fr (in Hertz), for each test position as well as the decay time data for each test position is entered into the formula:

Q=(27.3)(fr)(decay time in seconds per 25 dB decay span).

The resulting Q values for each test position are processed using known curve fitting techniques to identify any consistent relationship between test position and Q-factor values.

FIGS. 6 and 7 show the general relation between the A.C. current (wave) 70 supplied to the exciter coil 46 and the resultant vibrational wave 72 induced in the tested part 12. The A.C. current used in this invention is a pure A.C. current, without any D.C. offset. As shown in FIG. 6, the amplitude of the A./C. current 70 is symmetrical with respect to the zero current axis 74. Each time the current crosses the zero current axis the magnetic flux in exciter coil 46 reverses polarity (with a time lag between current flow and magnetic flux generation).

Disregarding time lags inherent in the electro-magnet action, each current crossing of the zero current axis reduces the magnetic force on test part 12 to zero; as the current then increases from the zero value (in the positive or negative direction) the magnetic flux builds up to produce a new magnetic force on test part 12. The A.C. current crosses the zero current axis 74 twice per A.C. cycle, so that part 12 vibrates at twice the frequency of the input current to coil 46. FIG. 7 shows generally how the magnetic flux varies in relation to the A.C. current input, depicted in FIG. 6.

FIGS. 3, 4 and 5 show generally the current magnetic flux relationships that take place when the coil excitation current is a sinusoidal wave having a D.C. offset, as in the aforementioned U.S. Pat. No. 6,014,899. In FIG. 3, a sinusoidal input current signal 76 is combined with a D.C. signal 78, to produce the offset A.C. signal 80 depicted in FIG. 4. In this example, the magnitude of the D.C. signal 78 is set so that the trough points 82 in the FIG. 4 signal touch the zero current axis to momentarily produce a zero magnetic flux condition.

There is one trough point 82 for each A.C. wave 80 cycle, so that the generated magnetic flux 84 (FIG. 5) cycles at the same frequency as the A.C. signal 80.

FIGS. 6 and 7 represent graphically the method of coil excitation used in the present invention. FIGS. 3 through 5 illustrate the prior art method of coil excitation. The method of coil excitation depicted in FIGS. 6 and 7 is believed to be an improvement over the prior art, in that the waveform generator and power amplifier can be less complex and less expensive to procure and maintain.

Apparatus used in practicing the present invention may be the same as that used in the practice of the invention described in U.S. Pat. No. 6,014,899, except for the wave generator and power amplifier that supply energizing current to the exciter coil.

What claimed is:

1. In a method of measuring vibration damping of a part that includes the steps of:
   1. vibrating said part at a selected frequency and amplitude, with an exciter coil located in near proximity to a magnetically permeable surface of the part;
   2. deactivating said exciter coil so that the amplitude of vibration decays;
   3. measuring the time required for the amplitude of vibration to experience a predetermined range of decay; and
   4. determining a vibration damping factor for the part, using the selected vibration frequency and the decay time measured in step (3);

the improvement wherein step (1) is carried out by applying an alternating current to said exciter coil at a frequency that is one half the selected frequency of vibration generated in the part; said alternating current having an amplitude that is symmetrical with respect to the zero current axis whereby the magnetic flux generated by the coil reverses polarity at the selected frequency of vibration of the part; said selected part vibration frequency being the resonant frequency of the part.

* * * * *